(12) United States Patent
Fassihi

(10) Patent No.: US 12,458,601 B2
(45) Date of Patent: Nov. 4, 2025

(54) TAMPER-RESISTANT DRUG DOSAGE FORMS AND METHODS OF MAKING AND USE THEREOF

(71) Applicant: Temple University—Of The Commonwealth System of Higher Education, Philadelphia, PA (US)

(72) Inventor: Reza A. Fassihi, Fort Washington, PA (US)

(73) Assignee: Temple University-Of The Commonwealth System of Higher Education, Philadelphia, PA (US)

( * ) Notice: Subject to any disclaimer, the term of this patent is extended or adjusted under 35 U.S.C. 154(b) by 614 days.

(21) Appl. No.: 17/284,746

(22) PCT Filed: Oct. 17, 2019

(86) PCT No.: PCT/US2019/056652
§ 371 (c)(1),
(2) Date: Apr. 12, 2021

(87) PCT Pub. No.: WO2020/081762
PCT Pub. Date: Apr. 23, 2020

(65) Prior Publication Data
US 2021/0322321 A1   Oct. 21, 2021

Related U.S. Application Data

(60) Provisional application No. 62/747,680, filed on Oct. 19, 2018.

(51) Int. Cl.
*A61K 9/20* (2006.01)
*A61K 9/28* (2006.01)
*A61K 45/06* (2006.01)

(52) U.S. Cl.
CPC ............ *A61K 9/204* (2013.01); *A61K 9/2027* (2013.01); *A61K 9/2095* (2013.01); *A61K 9/2893* (2013.01); *A61K 45/06* (2013.01)

(58) Field of Classification Search
CPC .... A61K 45/06; A61K 9/2027; A61K 9/2031; A61K 9/204; A61K 9/2095; A61K 9/2893; A61K 31/485; A61P 25/36
See application file for complete search history.

(56) References Cited

U.S. PATENT DOCUMENTS

| | | |
|---|---|---|
| 5,007,790 A | 4/1991 | Shell |
| 5,582,837 A | 12/1996 | Shell |
| 5,972,389 A | 10/1999 | Shell |
| 6,277,384 B1 | 8/2001 | Kaiko |
| 6,340,475 B2 | 1/2002 | Shell |
| 6,451,808 B1 | 9/2002 | Cowles |
| 6,488,962 B1 | 12/2002 | Berner |
| 7,682,633 B2 | 3/2010 | Matthews |
| 7,682,634 B2 | 3/2010 | Matthews |
| 7,815,934 B2 | 10/2010 | Boehm |
| 7,955,619 B2 | 6/2011 | Shah |
| 8,114,383 B2 | 2/2012 | Bartholomaeus |
| 8,192,722 B2 | 6/2012 | Arkenau-Maric |
| 8,389,007 B2 | 3/2013 | Wright |
| 8,445,018 B2 | 5/2013 | Habib |
| 8,685,443 B2 | 4/2014 | Boehm |
| 8,840,928 B2 | 9/2014 | Rariy |
| 9,044,402 B2 | 6/2015 | Tygesen |
| 9,216,176 B2 | 12/2015 | Habib |
| 9,572,803 B2 | 2/2017 | Habib |
| 2002/0051820 A1 | 5/2002 | Shell |
| 2003/0039688 A1 | 2/2003 | Shell |
| 2003/0044466 A1 | 3/2003 | Markey |
| 2003/0104053 A1 | 6/2003 | Gusler |
| 2003/0104062 A1 | 6/2003 | Berner |
| 2003/0147952 A1 | 8/2003 | Lim |
| 2012/0202838 A1 | 8/2012 | Ghosh |
| 2015/0297509 A1 | 10/2015 | Schwarz |
| 2016/0143858 A1 | 5/2016 | Sackler |
| 2017/0312226 A1 | 11/2017 | Gumudavelli |
| 2017/0333354 A9 | 11/2017 | Tygesen |

FOREIGN PATENT DOCUMENTS

| | | |
|---|---|---|
| WO | 1990011757 | 10/1990 |
| WO | 1993018755 | 9/1993 |
| WO | 1997047285 | 12/1997 |
| WO | 1998011879 | 3/1998 |
| WO | 1998055107 | 12/1998 |
| WO | 2001032217 | 5/2001 |
| WO | 2001056544 | 8/2001 |
| WO | 2001097783 | 12/2001 |
| WO | 2002032416 | 4/2002 |
| WO | 2002096404 | 12/2002 |
| WO | 2003035029 | 5/2003 |
| WO | 2003035039 | 5/2003 |
| WO | 2003035040 | 5/2003 |
| WO | 2003035041 | 5/2003 |
| WO | 2003035177 | 5/2003 |
| WO | 2019175100 | 9/2019 |

OTHER PUBLICATIONS

Larance, B., Dobbins, T., Peacock, A., Ali, R., Bruno, R., Lintzeris, N., . . . Degenhardt, L. (2018). The effect of a potentially tamper-resistant oxycodone formulation on opioid use and harm: main findings of the National Opioid Medications Abuse Deterrence (NOMAD) study. The Lancet Psychiatry, 5(2), 155-166.
Santini, Jr., J. T., Richards, A. C., Scheidt, R., Cima, M. J., & Langer, R. (2000). Microchips as Controlled Drug-Delivery Devices. Angewandte Chemie International Edition, 39(14), 2396-2407.
Nora D. Volkow, M.D., and A. Thomas McLellan, Ph.D.;Opioid Abuse in Chronic Pain—Misconceptions and Mitigation Strategies; N Engl J Med 2016; 374:1253-1263.

*Primary Examiner* — Jeffrey T. Palenik
(74) *Attorney, Agent, or Firm* — Riverside Law LLP

(57) ABSTRACT

A tamper resistant drug dosage is described. The drug dosage form includes a matrix polymer, a scaffold polymer, and a therapeutic agent, and the porosity of the drug dosage form is less than 10%. Methods for making and using the tamper resistant drug dosage forms are described.

8 Claims, 8 Drawing Sheets

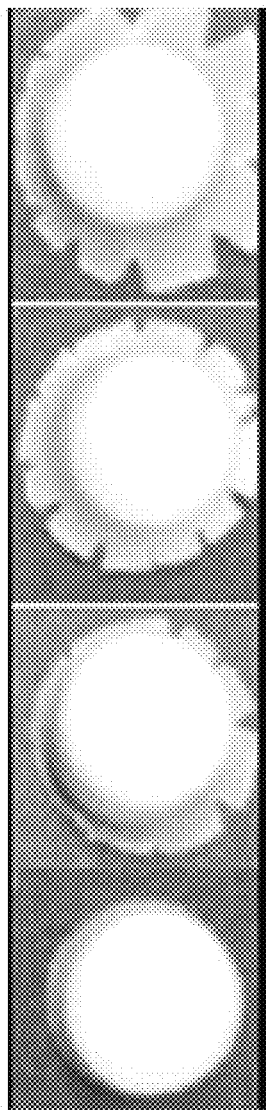
Fig. 2
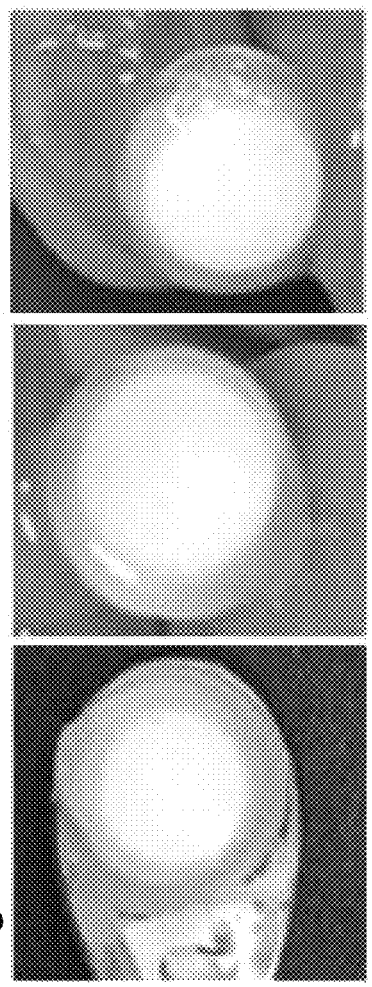
Fig. 3  2 hours  4 hours  6 hours

TAMPER-RESISTANT DRUG DOSAGE FORMS AND METHODS OF MAKING AND USE THEREOF

CROSS-REFERENCE TO RELATED APPLICATIONS

The present application is a 35 U.S.C. § 371 national phase application from, and claiming priority to, International Application No. PCT/US2019/056652, filed Oct. 17, 2019, which claims priority under 35 U.S.C. § 119(e) to U.S. Provisional Application No. 62/747,680, filed Oct. 19, 2018, all of which are hereby incorporated by reference in their entireties.

BACKGROUND

Pain is one of the most significant healthcare problems faced today. It impacts hundreds of millions of people across the world, profoundly affecting their quality of life and costing society countless billions of dollars in treatment along with lost productivity. 20% of the global adult population suffers from moderate to severe chronic pain. 1 in 10 adults is newly diagnosed with chronic pain each year. 100M Americans suffer from chronic pain—more than diabetes, chronic heart disease, and cancer combined.

Escalation in use of pharmaceutical opioids and opioid-related harms such as overdose and addiction in North America, Europe, and Australia is well-documented. The data for the United States show 18,000 deaths in 2012 vs 33,000 deaths in 2015 (Center for Disease Control: 2016; 'Vol.' 65, pp 1445-1452). Physicians in the USA wrote 259 million opioid prescriptions in 2012, enough for every household to have a bottle of narcotics (CDC MMWR, Vol. 63, No. 26, 563-566). Modified release tamper-resistant (MRTR) opioid formulations, intended to prevent dosage form manipulation by making them harder to "crush, chew, inhale, insufflate, snort or inject," have been promoted as one strategy to prevent opioid misuse. This approach has made it more difficult to misuse MRTR formulations, leading to a declining trend in the use of MRTR opioids (Lancet, 2018, Vol. 5, pp 155-166). Nonetheless, the strategy does not address all the issues related to detrimental effects of opioids including overuse and overprescribing at the population level.

When opioids are diverted because of their rewarding effects, they are typically taken at higher doses than were originally prescribed. In other cases, the pills are crushed so that the drug can be snorted, smoked, or injected. These routes of administration result in faster drug delivery into the brain, which in turn is associated with a rapid and more intense drug effect. Thus, strategies for abuse-deterrent formulations have been developed to minimize the likelihood that the opioids will be injected or snorted or taken at higher doses than prescribed (see Nora D. Volkow, M.D., and A. Thomas McLellan, Ph.D. The New England J. o f Medicine; 374:1253-63, 2016). These strategies include combining the opioid agonist with an antagonist, combining the opioid with a substance that triggers an adverse response, developing prodrugs that require enzymatic activation, and delivering the opioid in a form that cannot be crushed and extracted.

The opioid crisis has attracted attention from all corners of the health care field and from policymakers at all levels, including the nation's highest office. In 2016, the Centers for Disease Control and Prevention (CDC) took the important step of releasing guidelines on prescribing opioids for chronic pain in an attempt to shift U.S. physicians away from an opioid-centric strategy. At the same time, Pharma manufacturers, in keeping with their fiduciary responsibility, are working to ensure access to their products. In March, 2016: FDA released draft guidance: "General Principles for evaluating the Abuse Deterrence of Generic Solid Oral Opioid Drug Products". Nine new opioids approved with abuse-deterrent formulations, although not all on the market (latest in January 2017) including OxyContin® (oxycodone), Targiniq® ER (oxycodone and naloxone extended-release), Embeda® (morphine sulfate and naltrexone hydrochloride), Hysingla® ER (hydrocodone bitartrate extended-release), MorphaBond® ER (morphine sulfate extended-release), Xtampza® ER (oxycodone extended-release), Troxyca® ER (oxycodone hydrochloride and naltrexone hydrochloride extended-release), Arymo® ER (morphine sulfate extended-release), Vantrela® ER (hydrocodone bitartate extended-release).

There remains a need in the art for novel tamper-resistant drug dosage forms. The present invention fulfils this unmet need.

SUMMARY OF INVENTION

In one aspect, the present invention relates to a drug dosage form comprising a matrix polymer; a scaffold polymer; and a therapeutic agent; wherein the porosity of the drug dosage form is less than about 10%. In one embodiment, the matrix polymer is selected from the group consisting of polypropylene oxide, polyethylene oxide, polymethylene oxide, and mixtures, co-polymers, block co-polymers thereof. In one embodiment, the matrix polymer is polyethylene oxide. In one embodiment, the scaffold polymer is selected from the group consisting of polyvinylpyrrolidone, polyvinyl alcohol, polyvinyl acetate, polyethylene oxide, polymeric cellulose, carnauba wax, fatty acids, and mixtures, co-polymers, and block co-polymers thereof. In one embodiment, the scaffold polymer comprises polyvinylpyrrolidone and polyvinyl acetate. In one embodiment, the therapeutic agent is an opiate, opioid, tranquillizer, or other narcotic. In one embodiment, the porosity of the drug dosage form is less than about 5%. In one embodiment, porosity of the drug dosage form is less than about 1%. In one embodiment, the drug dosage form is a tablet. In one embodiment, the drug dosage form further comprises a microchip.

In another aspect, the present invention relates to a method of producing a tamper-resistant drug dosage form, the method comprising the steps of providing a composition comprising a matrix polymer, a scaffold polymer, and a therapeutic agent; and compressing the composition at a pressure greater than about 40 MPa to provide a drug dosage form with a porosity less than 10%. In one embodiment, the matrix polymer is selected from the group consisting of polypropylene oxide, polyethylene oxide, polymethylene oxide, and mixtures, co-polymers, block co-polymers thereof. In one embodiment, the matrix polymer is polyethylene oxide. In one embodiment, the scaffold polymer is selected from the group consisting of polyvinylpyrrolidone, polyvinyl alcohol, polyvinyl acetate, polyethylene oxide, polymeric cellulose, carnauba wax, fatty acids, and mixtures, co-polymers, and block co-polymers thereof. In one embodiment, the scaffold polymer comprises polyvinylpyrrolidone and polyvinyl acetate. In one embodiment, the compression is performed at a pressure greater than about 100 MPa. In one embodiment, the compression is performed at a punch speed between about 0.5 m/sec and about 2 m/sec.

In one embodiment, the method further comprises the step of disposing a coating over the drug dosage form. In one embodiment, the method does not include a sintering step.

In another aspect, the present invention relates to a method of producing a tamper-resistant drug dosage form, the method comprising the steps of: providing a composition comprising a matrix polymer, a scaffold polymer, and a therapeutic agent; feeding the composition through an extruder; heating the composition; and depositing the composition on a sample stage to form a tamper-resistant drug dosage form.

BRIEF DESCRIPTION OF THE DRAWINGS

The following detailed description of preferred embodiments of the invention will be better understood when read in conjunction with the appended drawings. For the purpose of illustrating the invention, there are shown in the drawings embodiments which are presently preferred. It should be understood, however, that the invention is not limited to the precise arrangements and instrumentalities of the embodiments shown in the drawings.

FIG. 2 depicts the effect of an over-application of tablet compression force.

FIG. 3 depicts the effect of exposing an exemplary drug dosage form to water after 2, 4, and 6 hours.

DETAILED DESCRIPTION

Figure 1:
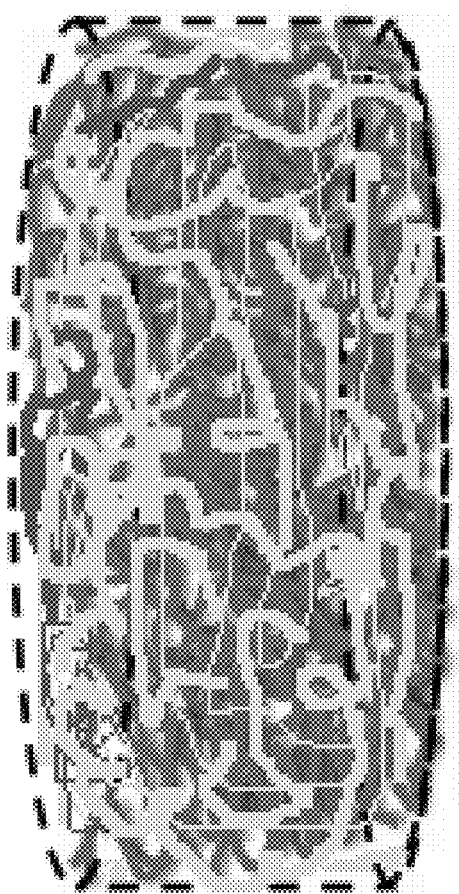
FIG. 1 is an illustration of an exemplary drug dosage form of the present invention.

The present invention is described with reference to the attached figures, wherein like reference numerals are used throughout the figures to designate similar or equivalent elements. The figures are not drawn to scale and they are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details or with other methods. The present invention is not limited by the illustrated ordering of acts or events, as some acts may occur in different orders and/or concurrently with other acts or events. Furthermore, not all illustrated acts or events are required to implement a methodology in accordance with the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Definitions

The terminology used herein is for the purpose of describing particular embodiments only and is not intended to be limiting of the invention.

As used herein, the singular forms "a", "an" and "the" are intended to include the plural forms as well, unless the context clearly indicates otherwise. Furthermore, to the extent that the terms "including", "includes", "having", "has", "with", or variants thereof are used in either the detailed description and/or the claims, such terms are intended to be inclusive in a manner similar to the term "comprising."

As used herein, the term "porosity" represents or designates % voids present in the final tablet after application of specific level of compression force. It may be convenient to consider the volume v of the sample under specific experimental conditions, relative to the true volume $v_t$. A useful dimensionless quantity relative volume ($v_r$) may be defined as: $v_r=v/v_t$ The relative volume decreases and tends toward unity as all the air is eliminated from the mass such as the situation that occurs in tablet compression processes. As powder is compressed the void spaces relative to the bulk volume decreases. This ratio of void volume to bulk volume is referred to as the porosity of the material and is generally expressed as a percentage value.

As used herein, the term "drug" refers to any bioactive agent, and the terms "drug" and "bioactive agent" are used interchangeably.

As used herein, the term "release" refers to the transfer of a drug from a tablet into the surrounding medium, typically a fluid.

As used herein, "dosage form" and "drug dosage form" are used interchangeably and refer to the physical appearance of a formulation including a drug, when ready for administration to a patient. For example, tablets, pills, capsules, suppositories, and subcutaneous inserts are all examples of dosage forms.

As used herein, the term "tamper resistant" refers to a dosage form such as a tablet, which cannot be physically modified, for example by crushing or dissolving, by an end user, for example a consumer.

As used herein, the term "sustained release" or "extended release" means that a therapeutic agent is released from a formulation at a controlled rate so that therapeutically beneficial blood levels (but below toxic levels) of the therapeutic agent are maintained over an extended period of time. Alternatively, "sustained release" or "extended release" means that the desired pharmacologic effect is maintained over an extended period of time.

The term "about" or "approximately" means within an acceptable error range for the particular value as determined by one of ordinary skill in the art, which will depend in part on how the value is measured or determined, i.e., the limitations of the measurement system. For example, "about" can mean within 1 or more than 1 standard deviation, per the practice in the art. Alternatively, "about" can mean a range of up to 20%, preferably up to 10%, more preferably up to 5%, and more preferably still up to 1% of a given value. Alternatively, particularly with respect to biological systems or processes, the term can mean within an order of magnitude, preferably within 5-fold, and more preferably within 2-fold, of a value. Where particular values are described in the application and claims, unless otherwise stated the term "about" meaning within an acceptable error range for the particular value should be assumed.

As used herein, the term "composition" or "pharmaceutical composition" refers to a mixture of at least one compound useful within the invention with a pharmaceutically acceptable carrier. The pharmaceutical composition facilitates administration of the compound to a patient or subject. Multiple techniques of administering a compound exist in the art including, but not limited to, intravenous, oral, aerosol, parenteral, ophthalmic, pulmonary and topical administration.

As used herein, the terms "effective amount," "pharmaceutically effective amount" and "therapeutically effective amount" refer to a nontoxic but sufficient amount of an agent to provide the desired biological result. That result may be reduction and/or alleviation of the signs, symptoms, or causes of a disease, or any other desired alteration of a biological system. An appropriate therapeutic amount in any individual case may be determined by one of ordinary skill in the art using routine experimentation.

As used herein, the term "pharmaceutically acceptable" refers to a material, such as a carrier or diluent, which does not abrogate the biological activity or properties of the compound, and is relatively non-toxic, i.e., the material may be administered to an individual without causing undesirable biological effects or interacting in a deleterious manner with any of the components of the composition in which it is contained.

As used herein, the language "pharmaceutically acceptable salt" refers to a salt of the administered compounds prepared from pharmaceutically acceptable non-toxic acids, including inorganic acids, organic acids, solvates, hydrates, or clathrates thereof. Examples of such inorganic acids are hydrochloric, hydrobromic, hydroiodic, nitric, sulfuric, phosphoric, acetic, hexafluorophosphoric, citric, gluconic, benzoic, propionic, butyric, sulfosalicylic, maleic, lauric, malic, fumaric, succinic, tartaric, amsonic, pamoic, p-toluenesulfonic, and mesylic. Appropriate organic acids may be selected, for example, from aliphatic, aromatic, carboxylic and sulfonic classes of organic acids, examples of which are formic, acetic, propionic, succinic, camphorsulfonic, citric, fumaric, gluconic, isethionic, lactic, malic, mucic, tartaric, para-toluenesulfonic, glycolic, glucuronic, maleic, furoic, glutamic, benzoic, anthranilic, salicylic, phenylacetic, mandelic, embonic (pamoic), methanesulfonic, ethanesulfonic, pantothenic, benzenesulfonic (besylate), stearic, sulfanilic, alginic, galacturonic, and the like. Furthermore, pharmaceutically acceptable salts include, by way of non-limiting example, alkaline earth metal salts (e.g., calcium or magnesium), alkali metal salts (e.g., sodium-dependent or potassium), and ammonium salts.

As used herein, the term "pharmaceutically acceptable carrier" means a pharmaceutically acceptable material, composition or carrier, such as a liquid or solid filler, stabilizer, dispersing agent, suspending agent, diluent, excipient, thickening agent, solvent or encapsulating material, involved in carrying or transporting a compound useful within the invention within or to the patient such that it may perform its intended function. Typically, such constructs are carried or transported from one organ, or portion of the body, to another organ, or portion of the body. Each carrier must be "acceptable" in the sense of being compatible with the other ingredients of the formulation, including the compound useful within the invention, and not injurious to the patient. Some examples of materials that may serve as pharmaceutically acceptable carriers include: sugars, such as lactose, glucose and sucrose; starches, such as corn starch and potato starch; cellulose, and its derivatives, such as sodium carboxymethyl cellulose, ethyl cellulose and cellulose acetate; various acrylate copolymers with functional groups, including anionic or cationic groups, designated for sustained or enteric drug release; carnauba waxes; fats and fatty acids; powdered tragacanth; malt extract; gelatin; talc; excipients, such as cocoa butter and suppository waxes; oils, such as peanut oil, cottonseed oil, safflower oil, sesame oil, olive oil, corn oil and soybean oil; glycols, such as propylene glycol; polyols, such as glycerin, sorbitol, mannitol and polyethylene glycol; esters, such as ethyl oleate and ethyl laurate; agar; buffering agents, such as magnesium hydroxide and aluminum hydroxide; surface active agents; alginic acid; pyrogen-free water; isotonic saline; Ringer's solution; ethyl alcohol; phosphate buffer solutions; and other non-toxic compatible substances employed in pharmaceutical formulations. As used herein, "pharmaceutically acceptable carrier" also includes any and all coatings, antibacterial and antifungal agents, and absorption delaying agents, and the like that are compatible with the activity of the compound useful within the invention, and are physiologically acceptable to the patient. Supplementary active compounds may also be incorporated into the compositions. The "pharmaceutically acceptable carrier" may further include a pharmaceutically acceptable salt of the compound useful within the invention. Other additional ingredients that may be included in the pharmaceutical compositions used in the practice of the invention are known in the art and described, for example in Remington's Pharmaceutical Sciences (Genaro, Ed., Mack Publishing Co., 1985, Easton, PA), which is incorporated herein by reference.

As used herein, the term "safe and effective amount" refers to the quantity of a component which is sufficient to yield a desired therapeutic response without undue adverse side effects (such as toxicity, irritation, or allergic response) commensurate with a reasonable benefit/risk ratio when used in the manner of this invention. By "therapeutically effective amount" is meant an amount of a compound of the present invention effective to yield the desired therapeutic response. The specific safe and effective amount or therapeutically effective amount will vary with such factors as the particular condition being treated, the physical condition of the patient, the type of mammal or animal being treated, the duration of the treatment, the nature of concurrent therapy (if any), and the specific formulations employed and the structure of the compounds or its derivatives.

The terms "patient" "individual," and "subject" are used interchangeably herein, and refers to a mammalian subject to be treated, with human patients being preferred. In some cases, the methods of the invention find use in experimental animals, in veterinary application, and in the development of animal models for disease, including, but not limited to, rodents including mice, rats, and hamsters; and primates.

"Treatment" is an intervention performed with the intention of preventing the development or altering the pathology or symptoms of a disorder. Accordingly, "treatment" refers to both therapeutic treatment and prophylactic or preventative measures. "Treatment" may also be specified as palliative care. Those in need of treatment include those already with the disorder as well as those in which the disorder is to be prevented. In tumor (e.g., cancer) treatment, a therapeutic agent may directly decrease the pathology of tumor cells, or render the tumor cells more susceptible to treatment by other therapeutic agents, e.g., radiation and/or chemotherapy. Accordingly, "treating" or "treatment" of a state, disorder or condition includes: (1) preventing or delaying the appearance of clinical symptoms of the state, disorder or condition developing in a human or other mammal that may be afflicted with or predisposed to the state, disorder or condition but does not yet experience or display clinical or subclinical symptoms of the state, disorder or condition; (2) inhibiting the state, disorder or condition, i.e., arresting, reducing or delaying the development of the disease or a relapse thereof (in case of maintenance treatment) or at least one clinical or subclinical symptom thereof; or (3) relieving the disease, i.e., causing regression of the state, disorder or condition or at least one of its clinical or subclinical symptoms. The benefit to an individual to be treated is either statistically significant or at least perceptible to the patient or to the physician.

A "therapeutic" treatment is a treatment administered to a subject who exhibits signs of pathology, for the purpose of diminishing or eliminating those signs.

Ranges: throughout this disclosure, various aspects of the invention can be presented in a range format. It should be understood that the description in range format is merely for convenience and brevity and should not be construed as an inflexible limitation on the scope of the invention. Accordingly, the description of a range should be considered to have specifically disclosed all the possible sub-ranges as well as individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, and 6. This applies regardless of the breadth of the range.

Compositions and Formulations

In one aspect, the invention relates to a drug dosage form comprising a matrix polymer, a scaffold polymer, and an active agent, wherein the drug dosage form has a porosity no greater than 10%.

The matrix polymer has the ability to hydrate and produces a viscous gel upon exposure to solvent. In one embodiment, the matrix polymer comprises a polyalkylene oxide (also known as a polyalkylene glycol) such as polypropylene oxide, polyethylene oxide, polymethylene oxide (polyoxymethylene), and combinations, co-polymers, and block-copolymers thereof. In one embodiment, the matrix polymer comprises polyethylene oxide.

In one embodiment, the matrix polymer is a high molecular weight polymer. In one embodiment, the matrix polymer has a molecular weight between 1,000,000 Da and 7,000,000 Da. In one embodiment, the matrix polymer has a molecular weight between 4,000,000 Da and 7,000,000 Da. In one embodiment, the matrix polymer has a molecular weight of about 4,000,000 Da. In one embodiment, the matrix polymer has a molecular weight of about 7,000,000 Da.

In one embodiment, the matrix polymer has a glass temperature (Tg) less than or equal to about 0° C. In one embodiment, the matrix polymer has a glass temperature less than or equal to about −10° C. In one embodiment, the matrix polymer has a glass temperature less than or equal to about −20° C. In one embodiment, the matrix polymer has a glass temperature less than or equal to about −30° C. In one embodiment, the matrix polymer has a glass temperature less than or equal to about −40° C. In one embodiment, the matrix polymer has a glass temperature less than or equal to about −50° C. In one embodiment, the matrix polymer has a glass temperature less than or equal to about −60° C. In one embodiment, the matrix polymer has a glass temperature less than or equal to about −70° C.

In one embodiment, the matrix polymer has a melting point between about 30° C. and about 100° C. In one embodiment, the matrix polymer has a melting point between about 40° C. and about 90° C. In one embodiment, the matrix polymer has a melting point between about 50° C. and about 80° C. In one embodiment, the matrix polymer has a melting point between about 55° C. and about 70° C.

In one embodiment, the mass ratio of matrix polymer to scaffold polymer is about 1:10. In one embodiment, the mass ratio of matrix polymer to scaffold polymer is about 1:9. In one embodiment, the mass ratio of matrix polymer to scaffold polymer is about 1:8. In one embodiment, the mass ratio of matrix polymer to scaffold polymer is about 1:7. In one embodiment, the mass ratio of matrix polymer to scaffold polymer is about 1:6. In one embodiment, the mass ratio of matrix polymer to scaffold polymer is about 1:5. In one embodiment, the mass ratio of matrix polymer to scaffold polymer is about 1:4. In one embodiment, the mass ratio of matrix polymer to scaffold polymer is about 1:3. In one embodiment, the mass ratio of matrix polymer to scaffold polymer is about 1:2. In one embodiment, the mass ratio of matrix polymer to scaffold polymer is about 1:1. In one embodiment, the mass ratio of matrix polymer to scaffold polymer is about 2:1. In one embodiment, the mass ratio of matrix polymer to scaffold polymer is about 3:1. In one embodiment, the mass ratio of matrix polymer to scaffold polymer is about 4:1. In one embodiment, the mass ratio of matrix polymer to scaffold polymer is about 5:1. In one embodiment, the mass ratio of matrix polymer to scaffold polymer is about 6:1. In one embodiment, the mass ratio of matrix polymer to scaffold polymer is about 7:1. In one embodiment, the mass ratio of matrix polymer to scaffold polymer is about 8:1. In one embodiment, the mass ratio of matrix polymer to scaffold polymer is about 9:1. In one embodiment, the mass ratio of matrix polymer to scaffold polymer is about 10:1.

The scaffold polymer forms an insoluble but porous backbone for the matrix polymer. In one embodiment, the scaffold polymer comprises at least one scaffolding polymer. Exemplary scaffolding polymers include, but are not limited to, polyvinylpyrrolidone (PVP); polymeric cellulose derivatives such as carboxymethyl cellulose (CMC), hydroxypropyl cellulose (HPC), hydroxyethyl cellulose (HEC), hydroxypropylmethylcellulose (HPMC), hydroxypropyl methylcellulose acetate succinate (HPMCAS), gelatin, pregelatinized starch, sorbitol, glucose, polyvinyl acetate (PVA), poly(meth)acrylates, methacrylic acid copolymer, ammonio methacrylate copolymer, polyvinyl alcohol, polyvinyl alcohol phthalate, polyethylene oxide, carbomer, methacrylic acid, sodium alginate, calcium alginate, and combinations, mixtures, co-polymers, and block co-polymers thereof. In one embodiment, the scaffold polymer comprises a wax. In one embodiment, the scaffold polymer comprises carnauba wax. In one embodiment, the scaffold comprises palm wax.

In one embodiment, the scaffold polymer comprises non-cross-linked PVP (Plasdone®, Kollidon®, or povidone). In one embodiment, the scaffold polymer comprises Plasdone® K-25, Plasdone® K-26/28, Plasdone® K-29/32, Plasdone® C-15, Plasdone® C-30, Plasdone® C-90, Kollidon® 12 PF, Kollidon® 17 PF, Kollidon® 25, Kollidon® 30, and Kollidon® 90. In one embodiment, the scaffold polymer comprises cross-linked PVP, such as Polyplasdone XL®, Polyplasdone XL® 10, Kollidon® CL, and Kollidon® CL-M.

In one embodiment, the scaffold polymer comprises a mixture, co-polymer, or block co-polymer of more than one scaffolding polymer. In one embodiment, the scaffold polymer comprises a mixture, co-polymer, or block co-polymer of polyvinylpyrrolidone and polyvinyl acetate. In one embodiment, the scaffold polymer comprises Kollidon® VA 64, a copolymer of vinylpyrrolidone and polyvinyl acetate of average molecular weight 60000±15000. In one embodiment, the scaffold polymer comprises Kollidon® SR, a blend of polyvinyl acetate and polyvinylpyrrolidone (Povidone®) (K 30) in the ratio 8:2. In one embodiment, the scaffold polymer comprises Copovidone® S-630, a copolymer of polyvinylacetate and polyvinylpyrrolidone. In one embodiment, the scaffold polymer comprises a spray-dried mixture of polyvinylacetate and polyvinylpyrrolidone in a ratio of 4:1.

There is no particular limit to the molecular weight of the scaffold polymer. In one embodiment, the molecular weight of the scaffold polymer is between about 2,000 Da and 2,000,000 Da. In one embodiment, the molecular weight of the scaffold polymer is about 50,000 Da. In one embodiment, the molecular weight of the scaffold polymer is about 450,000 Da.

In one embodiment, the weight ratio of matrix polymer to scaffold polymer is between about 10:1 and about 1:10. In one embodiment, the weight ratio of matrix polymer to scaffold polymer is between about 7:3 and about 3:7. In one embodiment, the weight ratio of matrix polymer to scaffold polymer is about 10:1, about 9:1, about 8:1, about 7:1, about 6:1, about 5:1, about 4:1, about 3:1, about 2:1, about 1:1, about 1:2, about 1:3, about 1:4, about 1:5, about 1:6, about 1:7, about 1:8, about 1:9, or about 1:10.

In one embodiment, the drug dosage form further comprises an excipient. In one embodiment, the drug dosage form further comprises a coating. Exemplary coatings include, but are not limited to, hydroxypropylmethyl cellulose (HPMC), hydroxypropyl methylcellulose acetate succinate (HPMCAS), methacrylic acid derivatives, HPMC phthalates and phthalate esters.

In one embodiment, the drug dosage form comprises a therapeutic agent. In one embodiment, the therapeutic agent is an opiate, opioid, tranquillizer, antipsychotic, or other narcotic or compound known to be subject to abuse. In one embodiment, the therapeutic agent is selected from the group consisting of alfentanil, allobarbital, allylprodine, alphaprodine, alprazolam, amfepramone, amphetamine, amphetaminil, barbital, benzylmorphine, bezitramide, bromazepam, brotizolam, buprenorphine, butobarbital, butorphanol, camazepam, cathine/D-norpseudoephedrine, chlorodiazepoxide, clobazam, clonazepam, clonitazene, clorazepate, clotiazepam, cloxazolam, cocaine, codeine, cyclobarbital, cyclorphan, cyprenorphine, delorazepam, desomorphine, dextromoramide, dextropropoxyphen, dezocine, diampromide, diamorphone, diazepam, dihydrocodeine, dihydromorphine, dimenoxadol, dimepheptanol, dimethylthiambutene, dioxaphetyl butyrate, dipipanone, dronabinol, eptazocine, estazolam, ethoheptazine, ethylm-ethylthiambutene, ethyl loflazepate, ethylmorphine, etonitazene, etorphine, fencamfamine, fenethylline, fentanyl, fludiazepam, flunitrazepam, flurazepam, halazepam, haloxazolam, heroin, hydrocodone, hydromorphone, hydroxypethidine, isomethadone, hydroxymethyl morphinane, ketazolam, ketobemidone, levacetylmethadol/LAAM, levomethadone, levorphanol, levophenacylmorphane, lofentanil, loprazolam, lorazepam, lormetazepam, mazindol, medazepam, mefenorex, meperidine, meprobamate, meptazinol, metazocine, methylmorphine, methamphetamine, methadone, methaqualone, methylphenidate, methylphenobarbital, methyprylon, metopon, midazolam, modafinil, morphine, myrophine, nabilone, nalbuphine, nalorphine, naloxone, naltrexone, narceine, nicomorphine, nimetazepam, nitrazepam, nordazepam, norlevorphanol, normethadone, normorphine, norpipanone, opium, oxazepam, oxazolam, oxycodone, oxymorphone, plants and parts of plants belonging to the species *Papaver somniferum*, including the subspecies *setigerum*, papavereturn, pernoline, pentazocine, pentobarbital, pethidine, phenadoxone, phenomorphan, phenazocine, phenoperidine, piminodine, pholcodine, phenmetrazine, phenobarbital, phentermine, pinazepam, pipradrol, piritramide, prazepam, profadol, proheptazine, promedol, properidine, propoxyphene, propiram, remifentanil, secbutabarbital, secobarbital, sufentanil, temazepam, tetrazepam, cis- and trans-tilidine, tramadol, triazolam, vinylbital, tapentadol, faxeladol, axomadol, stereoisomers, esters, physiologically acceptable salts and solvates thereof, and combinations thereof.

In one embodiment, the drug delivery form comprises therapeutic agents other than opioid analgesics which are subject to abuse may be used in accordance with the present invention in place of the opioid analgesics in the dosage form. Certain agents include, for example and without limitation, tranquilizers, CNS depressants, CNS stimulants, sedative hypnotics and the like. More specifically, barbiturates such as phenobarbital, secobarbital, pentobarbital, butabarbital, talbutal, aprobarbital, mephobarbital, butalbital, pharmaceutically acceptable salts thereof, and the like; benzodiazepines such as diazepam, chlordiazepoxide, alprazolam, triazolam, estazolam, clonazepam, flunitrazepam, pharmaceutically acceptable salts thereof, and the like; stimulants such as gamma-hydroxybutyrate, dextroamphetamine, methylphenidate, sibutramine, methylenedioxymethamphetamine, pharmaceutically acceptable salts thereof, and the like; and other agents such as marinol, meprobamate, carisoprodol, pharmaceutically acceptable salts thereof and the like.

In one embodiment, the drug dosage form further comprises a fatty acid or a salt thereof, such as for example stearic acid, lauric acid, or other short, medium and long chain fatty acids. Exemplary salts include sodium salts, potassium salts, lithium salts, or any other pharmaceutically acceptable salts thereof.

In one embodiment, the therapeutic agent may be homogeneously dispersed in the drug dosage form of the invention. In another embodiment, the therapeutic agent may be non-homogeneously dispersed in the drug dosage form. In one embodiment, the therapeutic agent may be layered in the drug dosage form. In some embodiments, the therapeutic agent is present in the drug dosage form in an amount of about 1 mg to about 200 mg; about 1 mg to about 150 mg; about 1 mg to about 125 mg; or about 1 mg to about 100 mg. In some embodiments, the therapeutic agent is present in the composition in an amount of about 5 mg to about 80 mg; about 10 mg to about 70 mg; about 15 mg to about 60 mg; about 40 mg to about 80 mg; about 50 mg to about 70 mg;

or about 45 mg to about 60 mg. In one embodiment, the therapeutic agent is present in the composition in an amount of about 20 mg, about 40 mg, about 60 mg, about 75 mg, about 80 mg, about 100 mg, about 120 mg, about 140 mg, about 150 mg, about 160 mg, about 175 mg, about 180 mg, or about 200 mg. In one embodiment, the therapeutic agent is present in the composition in an amount of about 2 mg. In another embodiment, the therapeutic agent is present in the composition in an amount of about 150 mg.

In one embodiment of the invention, the compounds of the invention are administered to a patient, alone or in combination with another pharmaceutical agent, using a controlled release formulation.

In one embodiment, the drug dosage form is an orally administrable solid dosage formulation. Non-limiting examples of oral solid dosage formulations include tablets, capsules including a plurality of granules, sublingual tablets, powders, granules, syrups, and buccal dosage forms. In some embodiments, tablets have an enteric coating or a hydrophilic coating.

Formulations may be employed in admixtures with conventional excipients, i.e., pharmaceutically acceptable organic or inorganic carrier substances suitable for oral, parenteral, nasal, intravenous, subcutaneous, enteral, or any other suitable mode of administration, known to the art. The pharmaceutical preparations may be sterilized and if desired mixed with auxiliary agents, e.g., lubricants, preservatives, stabilizers, wetting agents, emulsifiers, salts for influencing osmotic pressure buffers, coloring, flavoring and/or aromatic substances and the like. They may also be combined where desired with other active agents, e.g., other analgesic agents.

The present invention also includes a multi-layer tablet comprising a layer providing for the delayed release of one or more compounds of the invention, and a further layer providing for the immediate release of a medication for treatment of G-protein receptor-related diseases or disorders. Using a wax/pH-sensitive polymer mix, a gastric insoluble composition may be obtained in which the active ingredient is entrapped, ensuring its delayed release.

The drug dosage form has a porosity of less than about 10%. In one embodiment, the porosity of the drug dosage form is less than about 9%. In one embodiment, the porosity of the drug dosage form is less than about 8%. In one embodiment, the porosity of the drug dosage form is less than about 7%. In one embodiment, the porosity of the drug dosage form is less than about 6%. In one embodiment, the porosity of the drug dosage form is less than about 5%. In one embodiment, the porosity of the drug dosage form is less than about 4%. In one embodiment, the porosity of the drug dosage form is less than about 3%. In one embodiment, the porosity of the drug dosage form is less than about 2%. In one embodiment, the porosity of the drug dosage form is less than about 1%. In one embodiment, the drug dosage form comprises a porosity of less than about 10%.

In one embodiment, the porosity of the drug dosage form may be measured by porosimetry experiments, such as mercury porosimetry, which measure pore size distributions, total pore volume, total pore surface area, median pore diameter, sample densities for bulk and skeletal samples with resolution in the intrusion profile of 0.1 pL, or on a calibrated and computerized compaction simulator.

In one embodiment, the drug dosage form further comprises a microchip. In one embodiment, the microchip is capable of relaying a signal outside of the body. In one embodiment, the drug dosage form is a multi-layer tablet further comprising a microchip. In one embodiment, the drug dosage form is a two-layer tablet further comprising a microchip. In one embodiment, the drug dosage form is a three-layer tablet further comprising a microchip. In one embodiment, the microchip is activated by exposure to stomach conditions. The signal relayed by the microchip can by any signal known in the art. In one embodiment, the signal relayed by the microchip indicates that the drug dosage form has been ingested. In one embodiment, the signal relayed by the microchip indicates abuse or attempted abuse of the drug dosage form. In one embodiment, the microchip is passed by the digestive system following activation.

Methods of Making

In one aspect the invention relates to various methods, such as for example methods of preparing the compositions described here, or methods of making drug dosage forms from the compositions of the invention.

In one aspect, the invention describes a method of making a drug dosage form comprising the steps of providing a composition comprising a matrix polymer, a scaffold polymer, and a therapeutic agent; and compressing the composition under a compression pressure of greater than 40 MPa to provide a drug dosage form with a porosity less than 10%. In one embodiment, the composition is compressed under a compression pressure greater than about 40 MPa, about 50 MPa, about 60 MPa, about 70 MPa, about 40 MPa, about 50 MPa, about 60 MPa, about 70 MPa, about 80 MPa, about 90 MPa, about 100 MPa, about 110 MPa, about 120 MPa, about 130 MPa, about 140 MPa, about 150 MPa, about 160 MPa, about 170 MPa, about 180 MPa, about 190 MPa, about 200 MPa, about 210 MPa, about 220 MPa, about 230 MPa, about 240 MPa, or about 250 MPa.

In one embodiment, the composition is compressed at a normal rate of tablet production, such as for example 1,000 to 4,000 tablets per minute.

In one embodiment, the method of making a drug dosage form further comprises the step of disposing a coating over the drug dosage form. In one embodiment, the method of making a drug dosage form does not include a step of heating the drug dosage form or the composition greater than room temperature. In one embodiment, the step of compressing the drug dosage form replaces the step of sintering by heating in an oven that is typically used in the art. In one embodiment, the method of the present invention does not require an additional sintering step.

In one embodiment, the compression of the drug dosage form is applied with a punch speed of less than 5 m/sec. In one embodiment, the punch speed is less than 4 m/sec. In one embodiment, the punch speed is less than 3 m/s. In one embodiment, the punch speed is less than 2 m/sec. In one embodiment, the punch speed is less than 1 m/sec. In one embodiment, the punch speed is between about 1 and about 2 m/sec. In one embodiment, the punch speed is about 1.93 m/sec. In one embodiment, the punch speed is about 0.45 m/sec.

In one embodiment, the method of making the drug dosage form of the invention further comprises the step of embedding a microchip in the drug dosage form. In one embodiment, the microchip can be any such chip known in the art. In one embodiment, the method of making the drug dosage form comprises the step of preparing more than one tablet layer and inserting a microchip between said layers. In one embodiment, the microchip is resistant to the compression forces described herein.

In one embodiment, the method of producing a tamper-resistant drug dosage form comprises a 3D printing process.

In one embodiment, the 3D printing process comprises the steps of providing a composition comprising a matrix polymer, a scaffold polymer, and a therapeutic agent; feeding the composition through an extruder; heating the composition; and depositing the composition on a sample stage to form a tamper-resistant drug dosage form. In one embodiment, the 3D printing process further comprises the step of adding a microchip to the drug dosage form.

Methods of Use

In another aspect, the invention relates to methods of using the drug dosage form described, such as for example methods of treatment and methods of controlling drug release from the drug dosage form. In one embodiment, the drug dosage form of the present invention is resistant to tampering and/or abuse due to the unique properties instilled by the matrix polymer and the scaffolding polymer.

In one embodiment, the drug dosage form further comprises a microchip. In one embodiment, the microchip relays a signal. In one embodiment, the signal indicates that the drug dosage form has been ingested. In one embodiment, the signal indicates abuse of, or tamper with, the drug dosage form. In one embodiment, the signal is relayed to an external receiver. In one embodiment, the receiver is present on the subject's body, such as a patch or a wearable. In one embodiment, the signal is relayed to a device such as a mobile phone. In one embodiment, the signal is relayed directly to a physician or medical professional.

The period of time of the extended or controlled release may be as long as a month or more and should be a release which is longer that the same amount of agent administered in bolus form. In one embodiment of the present invention, the period of time is greater than about one day, about two days, about one week, about two weeks, about one month, about two months, and any and all ranges therebetween. In one embodiment, the period of time is between about 12 and about 24 hours. In another embodiment, the period of time is about 12 hours. In another embodiment, the period of time is about 14 hours. In another embodiment, the period of time is about 24 hours. In one embodiment, the sustained release formulation is administered once a day. In another embodiment, the sustained release formulation is administered twice or three times a day.

In one embodiment, the drug dosage forms of the present invention may be, but are not limited to, short-term, rapid-offset/onset, as well as controlled, for example, delayed release and pulsatile release formulations. The term delayed release is used herein in its conventional sense to refer to a drug formulation that provides for an initial release of the drug after some delay following drug administration and that mat, although not necessarily, includes a delay of from about 10 minutes up to about 24 hours. The term pulsatile release is used herein in its conventional sense to refer to a drug formulation that provides release of the drug in such a way as to produce pulsed plasma profiles of the drug after drug administration.

The term immediate release is used in its conventional sense to refer to a drug formulation that provides for release of the drug immediately after drug administration.

As used herein, short-term refers to any period of time up to and including about 8 hours, about 7 hours, about 6 hours, about 5 hours, about 4 hours, about 3 hours, about 2 hours, about 1 hour, about 40 minutes, about 20 minutes, or about 10 minutes and any or all whole or partial increments thereof after drug administration after drug administration.

As used herein, rapid-offset refers to any period of time up to and including about 8 hours, about 7 hours, about 6 hours, about 5 hours, about 4 hours, about 3 hours, about 2 hours, about 1 hour, about 40 minutes, about 20 minutes, or about 10 minutes, and any and all whole or partial increments thereof after drug administration.

Dosage

Administration of the tamper resistant controlled release formulations of therapeutic agent of the invention to a patient, preferably a mammal, more preferably a human, may be carried out using known procedures, at dosages and for periods of time effective to treat a disease or disorder in the patient. The effective amount of the dose of the sustained release formulations of a therapeutic agent of the invention necessary to achieve a therapeutic effect may vary according to factors such as the state of the disease or disorder in the patient; the age, sex, and weight of the patient; and the ability of the therapeutic formulation to treat a disease or disorder in the patient. Sustained release regimens may be adjusted to provide the optimum therapeutic response. For example, several divided doses may be administered daily or the dose may be proportionally reduced as indicated by the exigencies of the therapeutic situation. A non-limiting example of an effective dose range for a therapeutic compound of the invention is from about 1 and 5,000 mg/kg of body weight/per day. One of ordinary skill in the art would be able to study the relevant factors and make the determination regarding the effective amount of the therapeutic controlled release formulations of the invention without undue experimentation.

A suitable dose of a compound of the present invention may be in the range of from about 0.001 mg to about 5,000 mg per day, such as from about 0.1 mg to about 1,000 mg, for example, from about 1 mg to about 500 mg, such as about 5 mg to about 250 mg per day. The dose may be administered in a single dosage or in multiple dosages, for example from 1 to 4 or more times per day. When multiple dosages are used, the amount of each dosage may be the same or different. For example, a dose of 1 mg per day may be administered as two 0.5 mg doses, with about a 12-hour interval between doses.

Actual dosage levels of the active ingredients in the pharmaceutical compositions of this invention may be varied so as to obtain an amount of the active ingredient that is effective to achieve the desired therapeutic response for a particular patient, composition, and mode of administration, without being toxic to the patient.

The therapeutic tamper resistant controlled release composition of the invention may be administered to the subject either prior to or after the onset of a disease or disorder. Further, several divided dosages, as well as staggered dosages may be administered daily or sequentially, or the dose may be continuously infused, or may be a bolus injection. Further, the dosages of the therapeutic low dose, sustained release formulations of a therapeutic agent of the invention may be proportionally increased or decreased as indicated by the exigencies of the therapeutic or prophylactic situation.

In particular, the selected dosage level depends upon a variety of factors including the activity of the particular compound employed, the time of administration, the rate of excretion of the compound, the duration of the treatment, other drugs, compounds or materials used in combination with the compound, the age, sex, weight, condition, general health and prior medical history of the patient being treated, and like factors well known in the medical arts.

A medical doctor, e.g., physician or veterinarian, having ordinary skill in the art may readily determine and prescribe the effective amount of the therapeutic dose, sustained release formulations of a therapeutic agent required. For example, the physician or veterinarian could start doses of the compounds of the invention employed in the pharmaceutical composition at levels lower than that required in order to achieve the desired therapeutic effect and gradually increase the dosage until the desired effect is achieved.

In particular embodiments, it is especially advantageous to formulate the sustained release formulations of therapeutic of the invention in dosage unit form for ease of administration and uniformity of dosage. Dosage unit form as used herein refers to physically discrete units suited as unitary dosages for the patients to be treated; each unit containing a predetermined quantity of therapeutic compound calculated to produce the desired therapeutic effect in association with the required pharmaceutical vehicle. The dosage unit forms of the invention are dictated by and directly dependent on (a) the unique characteristics of the therapeutic compound and the particular therapeutic effect to be achieved, and (b) the limitations inherent in the art of compounding/formulating such a therapeutic compound for the treatment of a disease or disorder in a patient.

In one embodiment, the tamper resistant controlled release formulations of the invention are formulated using one or more pharmaceutically acceptable excipients or carriers. In one embodiment, the formulations of the invention comprise a therapeutically effective dose of a desired therapeutic agent and a pharmaceutically acceptable carrier.

It is understood that the amount of compound dosed per day may be administered, in non-limiting examples, every day, every other day, every 2 days, every 3 days, every 4 days, or every 5 days. For example, with every other day administration, a therapeutic dose, sustained release formulation of DNP of the invention may be initiated on Monday with a first subsequent dose administered on Wednesday, a second subsequent dose per day administered on Friday, and so on. In one embodiment, the compound is dosed at least once a day. In another embodiment, the compound is dosed at least twice a day.

In one embodiment, the controlled release composition of the invention is administered to the patient in dosages that range from one to five times per day or more. In another embodiment, the formulations of the invention are administered to the patient in range of dosages that include, but are not limited to, once every day, every two, days, every three days to once a week, and once every two weeks. It is readily apparent to one skilled in the art that the frequency of administration of the various combination compositions of the invention varies from individual to individual depending on many factors including, but not limited to, age, disease or disorder to be treated, gender, overall health, and other factors. Thus, the invention should not be construed to be limited to any particular dosage regime and the precise dosage and composition to be administered to any patient is determined by the attending physical taking all other factors about the patient into account.

In the case wherein the patient's status does improve, upon the doctor's discretion the administration of the inhibitor of the invention is optionally given continuously; alternatively, the dose of drug being administered is temporarily reduced or temporarily suspended for a certain length of time (i.e., a "drug holiday"). The length of the drug holiday optionally varies between 2 days and 1 year, including by way of example only, 2 days, 3 days, 4 days, 5 days, 6 days, 7 days, 10 days, 12 days, 15 days, 20 days, 28 days, 35 days, 50 days, 70 days, 100 days, 120 days, 150 days, 180 days, 200 days, 250 days, 280 days, 300 days, 320 days, 350 days, or 365 days. The dose reduction during a drug holiday includes from 10%-100%, including, by way of example only, 10%, 15%, 20%, 25%, 30%, 35%, 40%, 45%, 50%, 55%, 60%, 65%, 70%, 75%, 80%, 85%, 90%, 95%, or 100%.

Toxicity and therapeutic efficacy of such therapeutic regimens are optionally determined in cell cultures or experimental animals, including, but not limited to, the determination of the $LD_{50}$ (the dose lethal to 50% of the population) and the $ED_{50}$ (the dose therapeutically effective in 50% of the population). The dose ratio between the toxic and therapeutic effects is the therapeutic index, which is expressed as the ratio between $LD_{50}$ and $ED_{50}$. The data obtained from cell culture assays and animal studies are optionally used in formulating a range of dosage for use in human. The dosage of such compounds lies preferably within a range of circulating concentrations that include the $ED_{50}$ with minimal toxicity. The dosage optionally varies within this range depending upon the dosage form employed and the route of administration utilized.

Once improvement of the patient's conditions has occurred, a maintenance dose is administered if necessary. Subsequently, the dosage or the frequency of administration, or both, is reduced, as a function of the viral load, to a level at which the improved disease is retained. In one embodiment, patients require intermittent treatment on a long-term basis upon any recurrence of symptoms and/or infection.

The compounds for use in the method of the invention may be formulated in unit dosage form. The term "unit dosage form" or "dosage form," refers to physically discrete units suitable as unitary dosage for patients undergoing treatment, with each unit containing a predetermined quantity of active material calculated to produce the desired therapeutic effect, optionally in association with a suitable pharmaceutical carrier. The unit dosage form may be for a single daily dose or one of multiple daily doses (e.g., about 1 to 4 or more times per day). When multiple daily doses are used, the unit dosage form may be the same or different for each dose.

In one embodiment, the present invention is directed to a packaged pharmaceutical formulation comprising a container holding a therapeutically effective amount of a formulation of the invention, alone or in combination with a second pharmaceutical agent; and instructions for using the compound to treat, prevent, or reduce one or more symptoms of a disease or disorder in a patient.

Administration

Routes of administration of any of the compositions of the invention include oral, nasal, rectal, intravaginal, parenteral, buccal, sublingual, topical, or subcutaneous. The compounds for use in the invention may be formulated for administration by any suitable route, such as for oral or parenteral, for example, transdermal, transmucosal (e.g., sublingual, lingual, (trans)buccal, (trans)urethral, vaginal (e.g., trans- and perivaginally), (intra)nasal and (trans)rectal), intravesical, intrapulmonary, intraduodenal, intragastrical, intrathecal, subcutaneous, intramuscular, intradermal, intra-arterial, intravenous, intrabronchial, inhalation, topical, and subcutaneous administration.

Suitable compositions and dosage forms include, for example, tablets, capsules, caplets, pills, gel caps, troches, dispersions, suspensions, solutions, syrups, granules, beads, transdermal patches, gels, powders, pellets, magmas, lozenges, creams, pastes, plasters, lotions, discs, suppositories, liquid sprays for nasal or oral administration, dry powder or aerosolized formulations for inhalation, compositions and formulations for intravesical and subcutaneous administration, such as for example subcutaneous inserts, and the like. It should be understood that the formulations and compositions that would be useful in the present invention are not limited to the particular formulations and compositions that are described herein.

Oral Administration

For oral application, particularly suitable are tablets, dragees, liquids, drops, suppositories, or capsules, caplets and gelcaps. The compositions intended for oral use may be prepared according to any method known in the art and such compositions may contain one or more agents selected from the group consisting of inert, non-toxic pharmaceutically excipients that are suitable for the manufacture of tablets. Such excipients include, for example an inert diluent such as lactose, microcrystalline cellulose, or dicalcium phosphate; granulating and disintegrating agents such as cornstarch; binding agents such as starch; and lubricating agents such as magnesium stearate. The tablets may be uncoated or they may be coated by known techniques for elegance or to delay the release of the active ingredients. Formulations for oral use may also be presented as hard gelatin capsules wherein the active ingredient is mixed with an inert diluent.

For oral administration, the tamper resistant sustained release formulations of the invention of the invention may be in the form of tablets or capsules prepared by conventional means with pharmaceutically acceptable excipients such as binding agents (e.g., polyvinylpyrrolidone, hydroxypropylcellulose or hydroxypropylmethylcellulose); fillers (e.g., cornstarch, lactose, microcrystalline cellulose or calcium phosphate); lubricants (e.g., magnesium stearate, talc, or silica); disintegrants (e.g., sodium starch glycolate); or wetting agents (e.g., sodium lauryl sulphate). If desired, the tablets may be coated using suitable methods and coating materials such as OPADRY® film coating systems available from Colorcon, West Point, Pa. (e.g., OPADRY® OY Type, OYC Type, Organic Enteric OY-P Type, Aqueous Enteric OY-A Type, OY-PM Type and OPADRY® White, 32K18400. Liquid preparation for oral administration may be in the form of solutions, syrups or suspensions. The liquid preparations may be prepared by conventional means with pharmaceutically acceptable additives such as suspending agents (e.g., sorbitol syrup, methyl cellulose or hydrogenated edible fats); emulsifying agent (e.g., lecithin or acacia); non-aqueous vehicles (e.g., almond oil, oily esters or ethyl alcohol); and preservatives (e.g., methyl or propyl p-hydroxy benzoates or sorbic acid).

Granulating techniques are well known in the pharmaceutical art for modifying starting powders or other particulate materials of an active ingredient. The powders are typically mixed with a binder material into larger permanent free-flowing agglomerates or granules referred to as a "granulation." For example, solvent-using "wet" granulation processes are generally characterized in that the powders are combined with a binder material and moistened with water or an organic solvent under conditions resulting in the formation of a wet granulated mass from which the solvent must then be evaporated.

Melt granulation generally consists in the use of materials that are solid or semi-solid at room temperature (i.e. having a relatively low softening or melting point range) to promote granulation of powdered or other materials, essentially in the absence of added water or other liquid solvents. The low melting solids, when heated to a temperature in the melting point range, liquefy to act as a binder or granulating medium. The liquefied solid spreads itself over the surface of powdered materials with which it is contacted, and on cooling, forms a solid granulated mass in which the initial materials are bound together. The resulting melt granulation may then be provided to a tablet press or be encapsulated for preparing the oral dosage form. Melt granulation improves the dissolution rate and bioavailability of an active (i.e. drug) by forming a solid dispersion or solid solution.

U.S. Pat. No. 5,169,645 discloses directly compressible wax-containing granules having improved flow properties. The granules are obtained when waxes are admixed in the melt with certain flow improving additives, followed by cooling and granulation of the admixture. In certain embodiments, only the wax itself melts in the melt combination of the wax(es) and additives(s), and in other cases both the wax(es) and the additives(s) melt.

Parenteral Administration

For parenteral administration, the tamper resistant sustained release formulations of the invention may be formulated for injection or infusion, for example, intravenous, intramuscular or subcutaneous injection or infusion, or for administration in a bolus dose and/or continuous infusion. Suspensions, solutions or emulsions in an oily or aqueous vehicle, optionally containing other formulatory agents such as suspending, stabilizing and/or dispersing agents may be used. Subcutaneous inserts are used for subcutaneous administration.

Additional Administration Forms

Additional dosage forms of this invention include dosage forms as described in U.S. Pat. Nos. 6,340,475; 6,488,962; 6,451,808; 5,972,389; 5,582,837; and 5,007,790. Additional dosage forms of this invention also include dosage forms as described in U.S. Patent Applications Nos. 20030147952; 20030104062; 20030104053; 20030044466; 20030039688; and 20020051820. Additional dosage forms of this invention also include dosage forms as described in PCT Applications Nos. WO 03/35041; WO 03/35040; WO 03/35029; WO 03/35177; WO 03/35039; WO 02/96404; WO 02/32416; WO 01/97783; WO 01/56544; WO 01/32217; WO 98/55107; WO 98/11879; WO 97/47285; WO 93/18755; and WO 90/11757.

Those skilled in the art recognizes, or is able to ascertain using no more than routine experimentation, numerous equivalents to the specific procedures, embodiments, claims, and examples described herein. Such equivalents were considered to be within the scope of this invention and covered by the claims appended hereto. For example, it should be understood, that modifications in reaction or formulation conditions, including but not limited to reaction times, reaction size/volume, and experimental reagents, such as solvents, catalysts, pressures, atmospheric conditions, e.g., nitrogen atmosphere, and reducing/oxidizing agents, with art-recognized alternatives and using no more than routine experimentation, are within the scope of the present application.

It is to be understood that wherever values and ranges are provided herein, all values and ranges encompassed by these values and ranges, are meant to be encompassed within the scope of the present invention. Moreover, all values that fall within these ranges, as well as the upper or lower limits of a range of values, are also contemplated by the present application.

The following examples further illustrate aspects of the present invention. However, they are in no way a limitation of the teachings or disclosure of the present invention as set forth herein.

EXPERIMENTAL EXAMPLES

The invention is further described in detail by reference to the following experimental examples. These examples are provided for purposes of illustration only, and are not intended to be limiting unless otherwise specified. Thus, the invention should in no way be construed as being limited to the following examples, but rather, should be construed to encompass any and all variations which become evident as a result of the teaching provided herein.

Without further description, it is believed that one of ordinary skill in the art can, using the preceding description and the following illustrative examples, make and utilize the compositions of the present invention and practice the claimed methods. The following working examples therefore, specifically point out the preferred embodiments of the present invention, and are not to be construed as limiting in any way the remainder of the disclosure.

Example 1: Tamper-Resistant Drug Dosage Form

It has been demonstrated that simply introducing a physical barrier to prevent the easy production of a fine powder from a tablet significantly reduces the incidence of prescription opioid abuse for that product. One such approach for creating a physical barrier includes sintering the polymer components in the tablet. Sintering of polymers in tablet matrices have been reported in the literature, mainly to alter the release of the active pharmaceutical ingredient. However, sintering has become prominent in the development of abuse deterrent formulations (ADFs) for extended release drug products. Patents involving the marketed drug product, OxyContin® (oxycodone), refers the use of a sintering process to cure a polymer, i.e. PEO resulting in increased tablet strength, making the tablet more resistant to cutting, grinding, and/or chewing (U.S. Pat. No. 8,192,722). Sintering is a well-known technique in powder metallurgy that may be used to beneficially transform material properties by thermally treating the materials. In most instances, the goal of sintering is to increase the resulting material's strength. In its simplistic definition, sintering involves the movement of particles that fuse together to form a new, larger and stronger particle. There are several factors that can affect the sintering process and ultimately the desired performance of the tablet; these factors include, but are not limited to, particle size distribution of the sintering agent, solubility of the non-sintering components within the sintering agent, sintering temperature, sintering duration, heating and cooling rate, heating environment, presence or absence of impurities, etc.

Disadvantages associated with tablet sintering includes longer production time, unconventional heating equipment necessary to accommodate a large number of tablets and their passage through the heating zones, stability issues and potential chemical incompatibilities, addition steps in manufacturing, and cost of manufacture.

Polyethylene oxide (PEO) has become a popular polymer choice for abuse deterrent formulations due to its unique chemical structure and physical properties. PEO is a thermoresponsive polymer, known for its strength-imparting properties in a solid dosage form, particularly when pre-treated thermally. PEO is amenable to thermal processes such as hot melt extrusion and sintering. The key properties of PEO that makes it a useful component of an ADF formulation include, the availability of high molecular-weight grades (1,000,000 MW to 7,000,000 MW), the molecule's linear backbone and lack of side groups, a low glass transition temperature ($T_g$, −70° C.), and low melting point (60-70° C.). In addition, PEO is known to form highly viscous, bio-adhesive gels when exposed to moisture and thus difficult to snort or inject.

Typical Binary or ternary mixtures of various excipients with PEO in desirable batch sizes and defined particle size ranges, containing different composition ratios of a particular excipient or polymeric material and PEO at levels such as 30, 50, and 70% w/w, are prepared. The components are weighed and mixed for a few minutes to ensure a uniform distribution of components ahead of mechanical blending in a size-appropriate twin-shell blender or V-blender. The mixture is blended for 5 min. After 5 min of blending, Mg stearate (1.0% w/w) is added to the blender, and the resulting mixture further blended for 2 min. Tablets with a target weight of 200-500 mg with 70% w/w PEO; 50% w/w PEO; or 30% w/w PEO are prepared on a rotary press tableting machine equipped with, for example 10 mm, standard, flat faced or concaved tooling. The tablets are generally prepared with either low porosity (LP) (~15-24%) or high porosity (HP) (25-28%) by adjusting the compression force until the target solid fraction is obtained.

Typical tablet sintering process involves exposure of tablets that are manufactured from the batch and are sintered for various durations (0, 10, 30, 60, 180, 540, 900 min) at 80° C. depending on the composition. After each sintering time point tablets are typically stored for at least 24 hours at ambient conditions before further evaluation.

Inventive Methods

In some embodiments of the present invention, the step of sintering after complete tablet production for different lengths of time in a heated oven is completely eliminated. Similarly, steps of pre-heating of tableting tools or the materials of the composition followed by tablet production are also rendered redundant and unnecessary by the present invention.

By utilizing a novel approach to tablet manufacture, the step of tablet sintering can be avoided altogether. The novel tablets include a pore forming polymer with an insoluble but soft backbone incorporated in the PEO matrix. Both polymers have the ability to consolidate to near zero porosity due their physical nature, extensive viscoelasticity, low glass transition temperature ($T_g$, −70° C.), and low melting point (60-70° C.). These characteristics are able to reach their full utility as far as ADF properties are concerned. In effect, an insoluble but porous scaffold is created within a gelling, plastically deforming, and mechanically bonding larger matrix of PEO (FIG. 1).

Note in FIG. 2 that the bonding aspect (known as asperity melting due to particle-particle interaction under high speed applied pressure) during compression force of many 1000 kg, together with very low glass transition temperature of −70° C. ($T_g$, −70° C.) and low melting point (60-70° C.), is sufficient to perform in-situ bonding (not sintering) without any application of heat. Here, in-situ bonding refers to the formation of bonds without application of heat. Many thousands of Kg force at the punch speed of ~1 to 2 meter per second, which is the normal force and speed used for tablet production, provides the necessary conditions for in-situ bonding. The adjustment of compression force permits porosity control with PEO which is extremely soft ($T_g$, −70° C.), to reach porosity of close to zero (<1% porosity). The unique control of PEO porosity is due in part to its unique $T_g$ of −70° C. In contrast to the inventive tablets, commercially available tablets generally have a porosity of 15-25% regardless of compression force applied. This is in part due to the unique Tg of PEO ($T_g$, −70° C.). It is the combination of the scaffolding polymer with PEO which is key to the ADF properties of the present invention. The tablets described herein do not allow for drawing of the active ingredient via syringe and cannot be broken, ground, or hammered. The only way that the drug can be released is via water penetration over time, which allows the drug to diffuse out and leaves a soft empty scaffold at the end which is then defecated.

Polyethylene oxide (PEO) of varying MW having unique viscoelastic characteristics as the main polymer together with other materials (polymers, gums, aversive agents, agonist/antagonists, etc.) were used as key component of the matrix system. Compressibility of PEO/ingredients mixture were evaluated using a compaction simulator at compression rate similar to that of rotary presses. Matrices (12 and 6 mm diameter) containing tramadol HCl/aversive agent (model drug) in binary or ternary systems were compressed and their tensile strength, crush-resistant properties (at 500 to 1000 N), dissolution rates (USP 34) and exposure to various solvents/liquids (water/alcohol) were evaluated.

Figure 4:
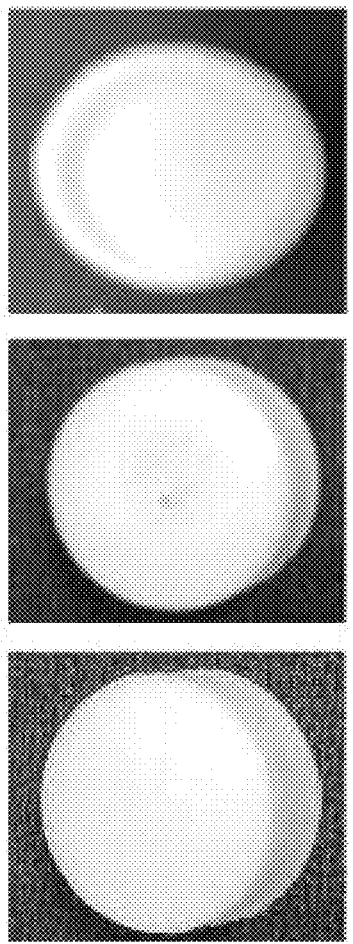
FIG. 4 depicts the physical appearance of an exemplary drug dosage form upon being stuck with a hammer.
Figure 5:
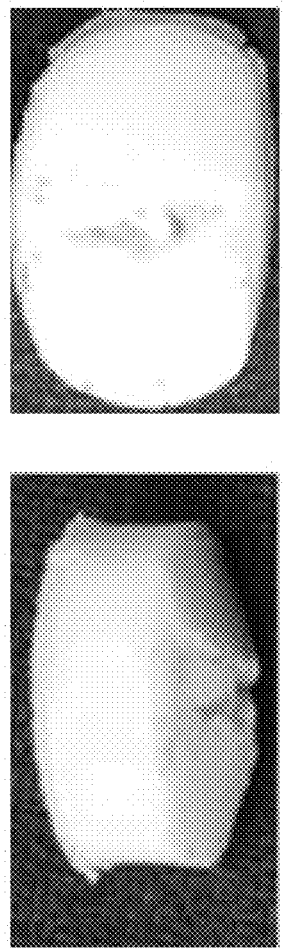
FIG. 5 depicts the physical appearance of an exemplary drug dosage form upon subjection to >700N diameterical pressure.
Figure 6:
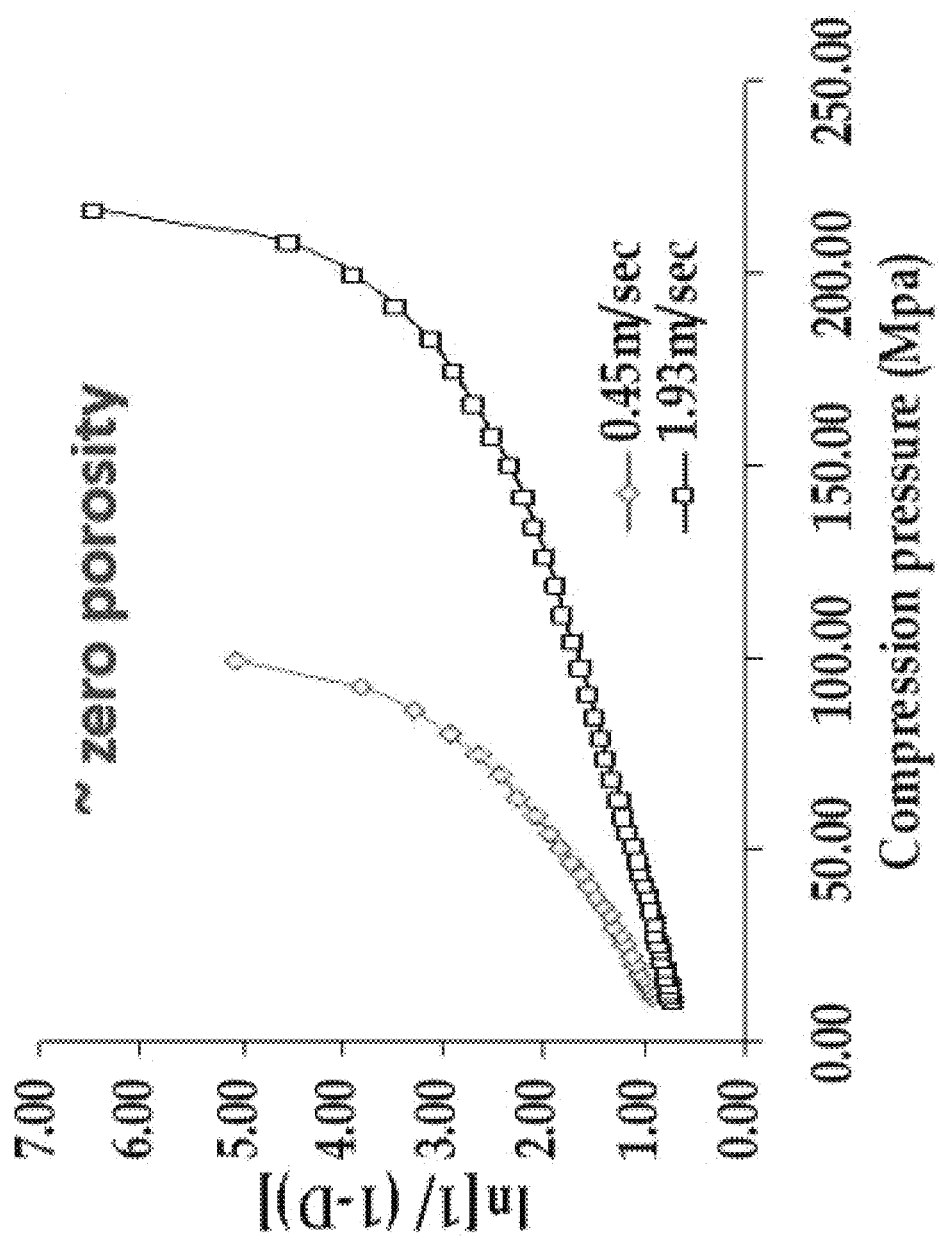
FIG. 6 is a Heckel plot for PEO:PVPc(4:1) matrices (PVPc=Kollidon SR).
Figure 7:
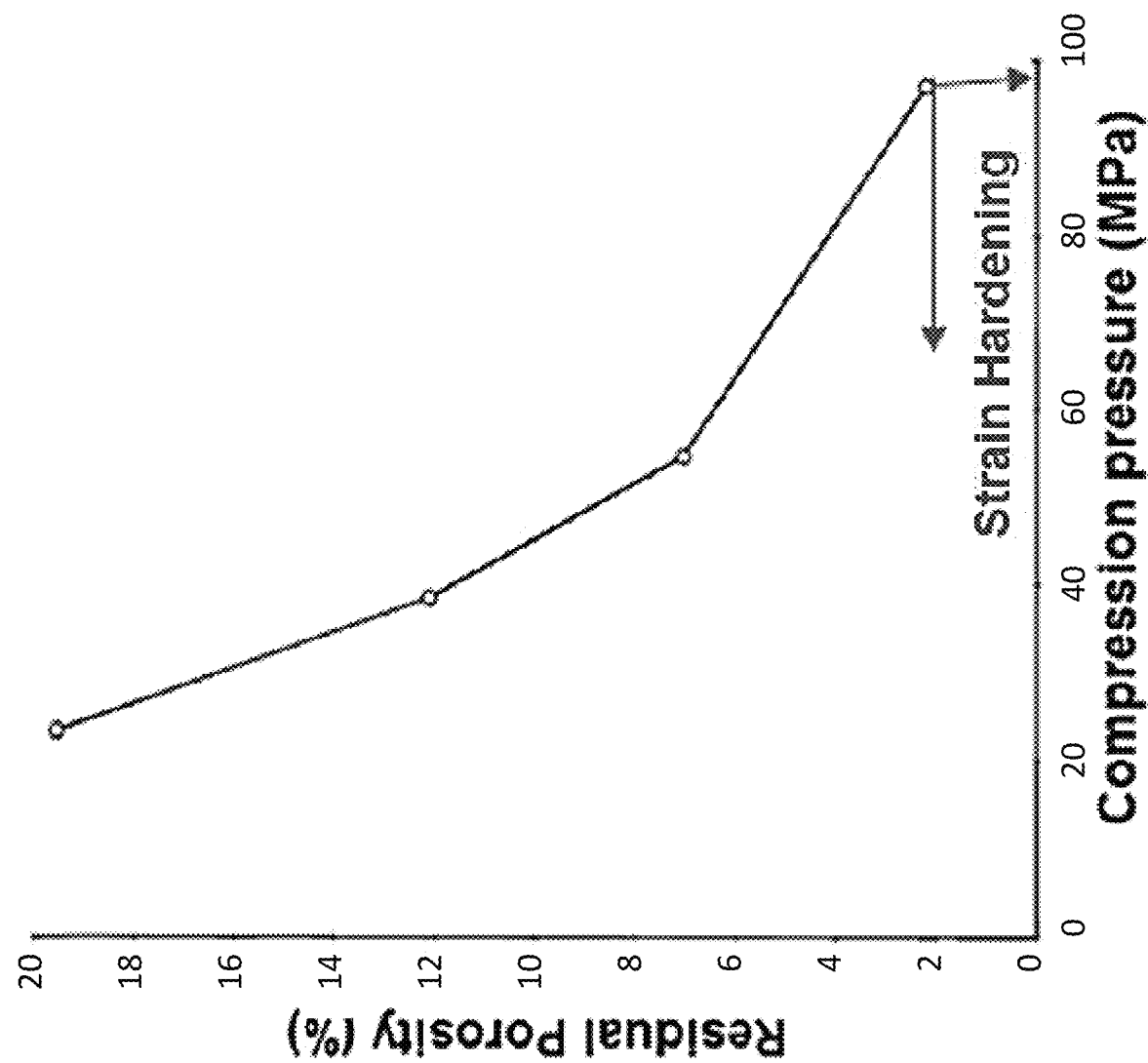
FIG. 7 is a plot of porosity vs pressure showing the drop in porosity with increasing compression pressure (i.e., strain hardening).

PEO has linear backbone structure and no side groups with a very low glass transition temperature (Tg, −70° C.) and melting point (55-70° C.). It has the ability to hydrate and produce a highly viscous bioadhesive gel while progressively swells and slowly dissolves during dissolution study. Binary and ternary compositions of PEO with acrylates, celluloses, and polyvinylpyrrolidone (PVP) in ratios of 1:1, 2:1, 2:1:1 and 4:1 with the model drug were compressed to achieve near-zero porosity matrix using Heckel equation and analysis. The results of exposure of the tablets to moisture are shown in FIG. 3. The tablets were struck with a hammer and did not fracture (FIG. 4). Diametrical pressure of ~700 N resulted in the tablets shown in FIG. 5. The result of punch speed is presented in FIG. 6. The plot of porosity vs compression pressure in FIG. 7 shows the unique properties of polyethylene oxide, as a near-zero porosity can be achieved with increased pressure application.

While not wishing to be bound by any particular scientific theory, it is possible that during consolidation particles grow together and lose their individuality, by diffusion over the contact interfaces, transitions of the composition and structure between the primary particles occur. With increases in pressure energy levels elevate with broad energy distribution and inter-particulate contacts at stressed loci. Extremes of energy levels in very small regions results in hot spots with rapid changes in energy levels with very short half-life (fraction of seconds). Asperity melting happens and complete solidification occurs.

Figure 8:
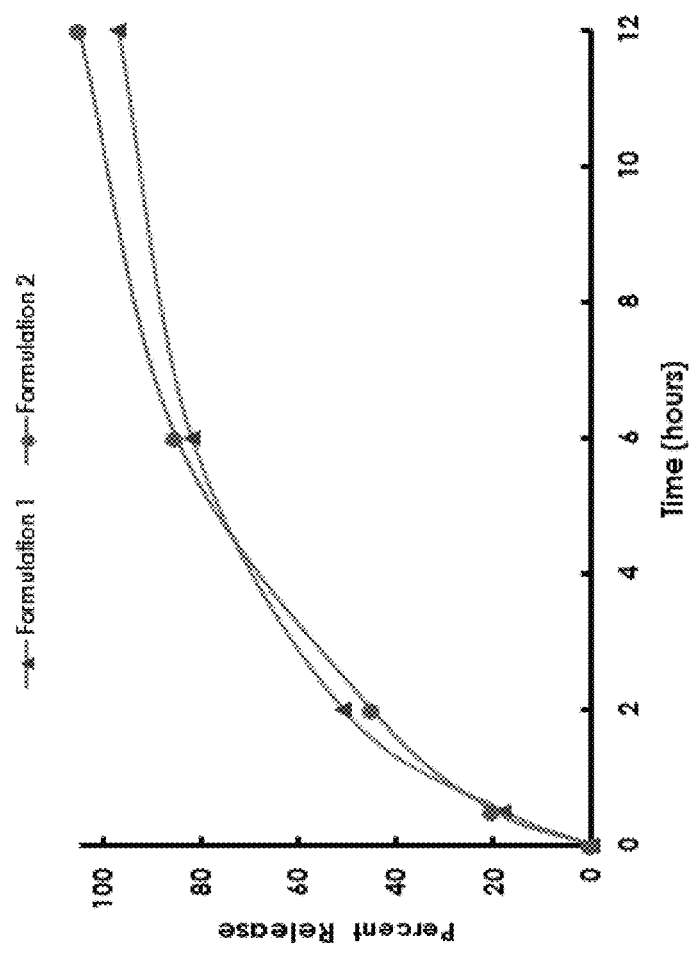
FIG. 8 is a plot of Tramadol release (100 mg) using standard USP dissolution methods (apparatus 1 and 2, with 500 ml and 1000 ml medium).
Figure 9:
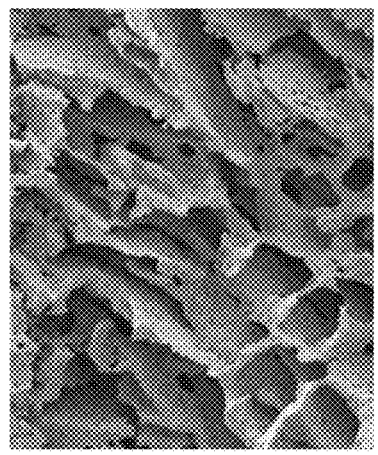
FIG. 9 is a picture of an exemplary drug dosage form.

Formulations with optimum composition and manufacturing controls as part of CQA's including specific application of force were developed by direct compression and demonstrated to be physically hard matrices useful as a abuse-deterrent systems. Matrices were not subjected to a post-manufacturing sintering step, and this paradigm shift in process resulted in matrices that were crush-resistant and resistant to tamper abuse. Matrices maintained their desired and sustained release properties (FIG. 8 and FIG. 9) in comparison to tampered and crush-resistant marketed products and demonstrated to be more robust and resistant to manipulations.

Example 2: Microchip Reporting

Figure 11:
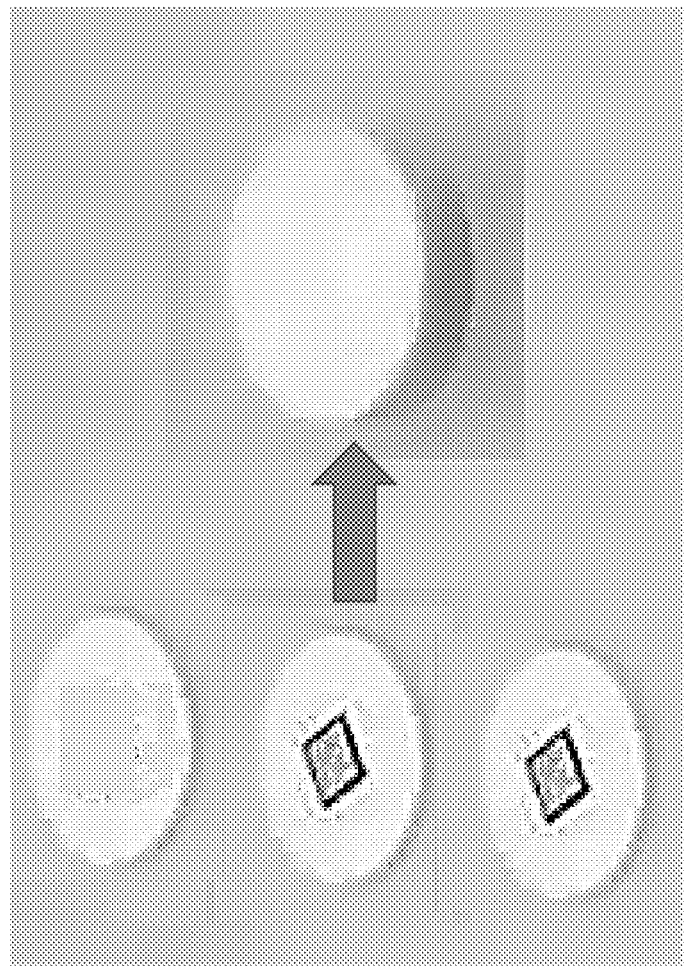
FIG. 11 is a schematic depicting the placement of multiple chips in an exemplary drug dosage form.
Figure 10:
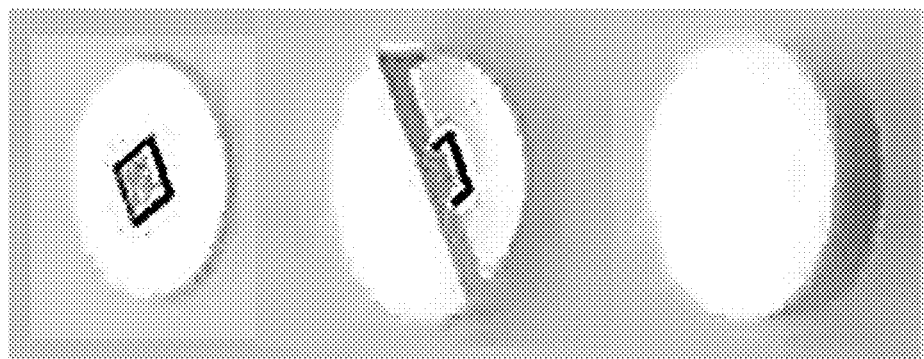
FIG. 10 is schematic depicting the placement of a microchip in an exemplary drug dosage form.

A silicon chip with the logic circuit, along with two pieces of metal: copper & magnesium, is embedded in the abuse-deterrent formulations (FIG. 10 and FIG. 11). The ADFs can have one or two chip in the two or three layered Tablet or Caplet or any dosage form for oral administration including sublingual and orally disintegrating tablet. Once activated, the chip—only 1 millimeter on a side, and 0.3 mm thick—sends a very simple signal, one that encodes only a single number, matching the code of a master receiver which is placed on or in the patient. That number identifies the pill and tells the wearable (or health system) that it has been ingested.

Figure 12:
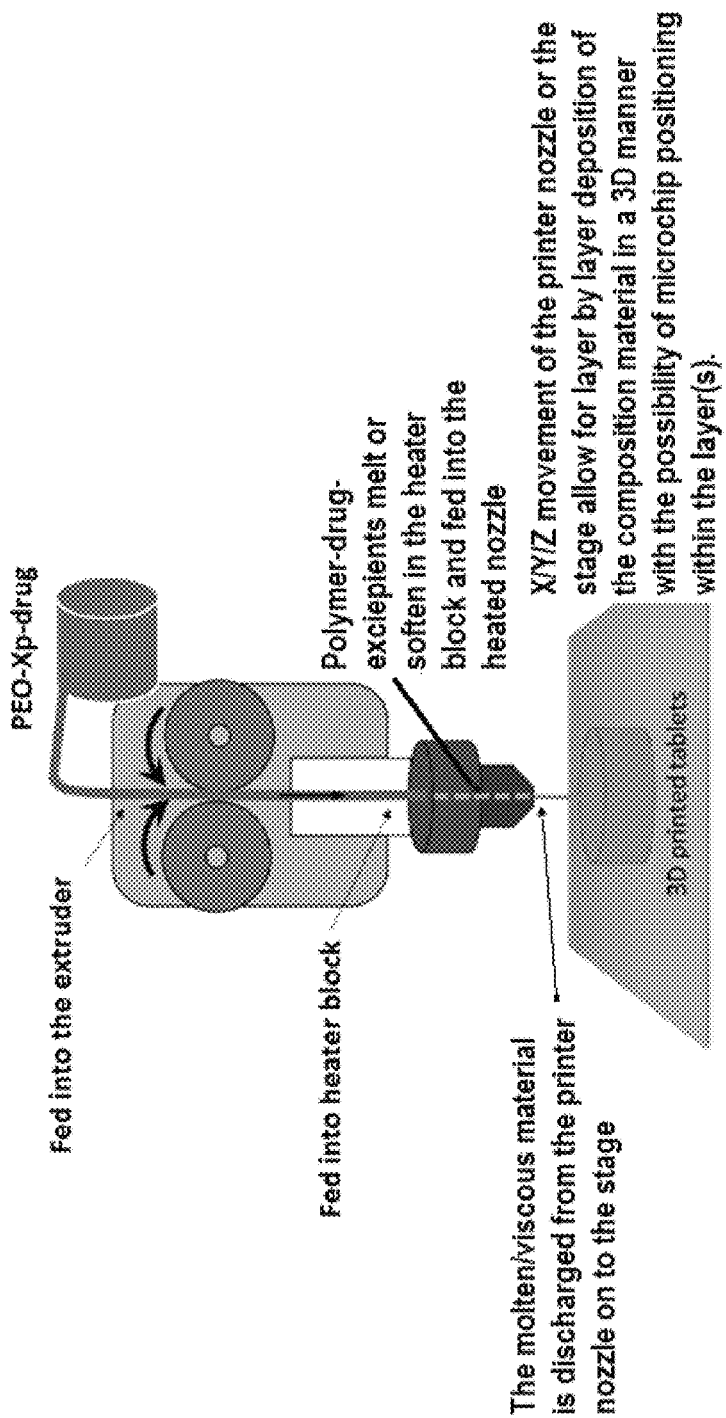
FIG. 12 depicts the process for 3D printing an exemplary drug dosage form.
Figure 13:
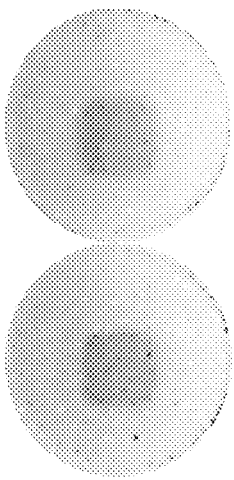
FIG. 13 is a photograph of an exemplary drug dosage form with an embedded microchip.

The ADF, with or without the silicon chip, can be manufactured via extrusion-based 3-dimensional (3D) printing (FIG. 12). A mixture of PEO-Xp-drug is fed into an extruder and through a heater block. The polymer-drug melts/softens in the heater block and is fed into the heated nozzle. The material is discharged from the nozzle of the print head. X, Y, and Z movements of the sample stage or the printer head allow the deposition of the material in a 3D manner with the possibility of microchip positioning within the layer(s), thereby producing 3D printed tablets (FIG. 13).

The disclosures of each and every patent, patent application, and publication cited herein are hereby incorporated herein by reference in their entirety. While this invention has been disclosed with reference to specific embodiments, it is apparent that other embodiments and variations of this invention may be devised by others skilled in the art without departing from the true spirit and scope of the invention. The appended claims are intended to be construed to include all such embodiments and equivalent variations.

The invention claimed is:

1. A drug dosage form comprising:
    a matrix polymer selected from the group consisting of polypropylene oxide, polyethylene oxide, polymethylene oxide, and mixtures, co-polymers, block co-polymers thereof;
    a scaffold polymer comprising polyvinylpyrrolidone and polyvinyl acetate; and
    a therapeutic agent;
    wherein the mass ratio of matrix polymer to scaffold polymer is about 4:1 to 3:1; and
    wherein the porosity of the drug dosage form is less than about 10%.

2. The drug dosage form of claim 1, wherein the matrix polymer comprises polyethylene oxide.

3. The drug dosage form of claim 1, wherein the scaffold polymer further comprises one or more selected from the group consisting of carboxymethyl cellulose, hydroxypropyl cellulose, hydroxypropyl ethylcellulose, hydroxypropyl methylcellulose, hydroxypropyl methylcellulose acetate succinate, gelatin, pregelatinized starch, sorbitol, glucose, poly(meth)acrylates, methacrylic acid, methacrylic acid copolymer, ammonio methacrylate copolymer, polyvinyl alcohol, polyvinyl alcohol phthalate, polyethylene oxide, carbomer, sodium alginate, calcium alginate, carnauba wax, palm wax, fatty acids, and mixtures, co-polymers, and block copolymers thereof.

4. The drug dosage form of claim 1, wherein the therapeutic agent is an opiate, opioid, tranquillizer, antipsychotic, or other compound known to be subject to abuse.

5. The drug dosage form of claim 1, wherein the porosity of the drug dosage form is less than about 5%.

6. The drug dosage form of claim 1, wherein the porosity of the drug dosage form is less than about 1%.

7. The drug dosage form of claim 1, wherein the drug dosage form is a tablet or a caplet.

8. The drug dosage form of claim 1, further comprising a microchip.

* * * * *